US009666139B2

(12) United States Patent
Tanada (10) Patent No.: US 9,666,139 B2
(45) Date of Patent: May 30, 2017

(54) TERMINAL APPARATUS AND METHOD OF CONTROLLING THE SAME

(71) Applicant: FUJITSU LIMITED, Kawasaki-shi, Kanagawa (JP)

(72) Inventor: Tosaku Tanada, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 14/285,805

(22) Filed: May 23, 2014

(65) Prior Publication Data
US 2014/0362008 A1 Dec. 11, 2014

(30) Foreign Application Priority Data
Jun. 7, 2013 (JP) .................................. 2013-120810

(51) Int. Cl.
*G06F 3/041* (2006.01)
*G09G 3/34* (2006.01)

(52) U.S. Cl.
CPC ........... *G09G 3/3406* (2013.01); *G06F 3/041* (2013.01); *G06F 3/0416* (2013.01); *G06F 2203/04108* (2013.01); *G09G 2320/0247* (2013.01); *G09G 2320/062* (2013.01); *G09G 2330/021* (2013.01); *G09G 2354/00* (2013.01); *G09G 2360/14* (2013.01)

(58) Field of Classification Search
CPC .............................. G06F 3/041; G06F 3/0416
USPC .................................................. 345/173–174
See application file for complete search history.

(56) References Cited

U.S. PATENT DOCUMENTS

| 2005/0134194 | A1* | 6/2005 | Murata | G09G 5/10 315/221 |
| 2008/0158172 | A1* | 7/2008 | Hotelling | G06F 1/3231 345/173 |
| 2012/0162110 | A1* | 6/2012 | Kobayashi | G06F 1/1643 345/173 |

FOREIGN PATENT DOCUMENTS

| JP | 4-16899 | 2/1992 |
| JP | 2005-181562 | 7/2005 |
| JP | 2007-79113 | 3/2007 |
| JP | 2009-198565 | 9/2009 |
| JP | 2012-054714 | 3/2012 |

(Continued)

OTHER PUBLICATIONS

JPOA—Notice of Reason for Rejection dated Jan. 10, 2017 with its machine translation issued in the corresponding to Japanese Patent Application No. 2013-120810.

*Primary Examiner* — Towfiq Elahi
(74) *Attorney, Agent, or Firm* — Fujitsu Patent Center (57) ABSTRACT

A terminal apparatus includes a light modulation unit to perform an automatic light modulation of a touch panel, an illuminance sensor, a proximity sensor, an illuminance determination unit to determine whether or not an illuminance detected by the illuminance sensor varies, and an operation determination unit to determine whether or not an operation of the touch panel occurs near the illuminance sensor, wherein the light modulation unit suspends the automatic light modulation when the operation of the touch panel occurs before a first time elapses after the detected illuminance decreases, and the light modulation unit suspends the automatic light modulation when the operation determination unit determines that the operation of the touch panel does not occur before the first time elapses after that (Continued)

the detected illuminance decreases and then the proximity sensor detects an object before a second time elapses.

12 Claims, 4 Drawing Sheets

(56) References Cited

FOREIGN PATENT DOCUMENTS

| | | |
|---|---|---|
| JP | 2012-137859 | 7/2012 |
| JP | 2012-208392 | 10/2012 |

\* cited by examiner

TERMINAL APPARATUS AND METHOD OF CONTROLLING THE SAME

CROSS-REFERENCE TO RELATED APPLICATION

This application is based upon and claims the benefit of priority of the prior Japanese Patent Application No. 2013-120810, filed on Jun. 7, 2013, the entire contents of which are incorporated herein by reference.

FIELD

The embodiments described herein are related to a terminal apparatus with a light modulation unit, a method of controlling a terminal apparatus with light modulation processing and a non-transitory recoding medium storing a program for controlling a terminal apparatus with light modulation processing.

BACKGROUND

Many of terminal apparatus such as mobile phone terminals which become popular lately include a variety of sensors such as acceleration sensors and luminance (environment light) sensors.

A sensor is a part of an electric circuit for converting a physical quantity including a magnitude of force, a length of distance and brightness into another type of physical quantity such as an electric signal. The mobile phone terminals use these sensors to improve the usability of the telephone units and to perform processes of a variety of applications.

A mobile phone terminal with an illuminance sensor is one example of applications of the above sensors. For example, it is conventional to change in a step-by-step manner the luminance value of light radiated from the light source of the backlight used for the display of the mobile phone terminal according to the output of the illuminance sensor. Generally, the illuminance sensor is provided adjacent to the display in order to detect the illuminance (brightness) around the display.

PATENT DOCUMENT

[Patent document 1] Japanese Laid-Open Patent Publication No. 2012-54714

SUMMARY

According to an aspect of the embodiments, it is provided a terminal apparatus including a light modulation unit to perform an automatic light modulation of a touch panel, an illuminance sensor provided adjacent to the touch panel, a proximity sensor provided adjacent to the illuminance sensor, an illuminance determination unit to determine whether or not an illuminance detected by the illuminance sensor varies by a predetermined amount, and an operation determination unit to determine whether or not an operation of the touch panel occurs in a predetermined area in a vicinity of the illuminance sensor, wherein the light modulation unit suspends the automatic light modulation of the touch panel when the operation determination unit determines that the operation of the touch panel occurs before a first time elapses after the illuminance determination unit determines that the illuminance detected by the illuminance sensor decreases by the predetermined amount, and the light modulation unit suspends the automatic light modulation of the touch panel when the operation determination unit determines that the operation of the touch panel does not occur before the first time elapses after the illuminance determination unit determines that the illuminance detected by the illuminance sensor decreases by the predetermined amount and then the proximity sensor detects an object before a second time elapses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

It is possible in a conventional technique that a user accidentally places a finger etc. on the illuminance sensor or moves the finger etc. away from the illuminance sensor when the user uses the mobile phone terminal. However, in the conventional techniques as described above, when the user places the finger etc. on the illuminance sensor or moves the finger etc. away from the illuminance sensor and the illuminance sensor consequently detects a rapid light-dark variation in a short time, the mobile phone terminal modulates the backlight according to the variation. Therefore, unfavorable flicker may occur on the display since the light intensity of the backlight repeatedly increases and decreases in a short time. Thus, it is one aspect of the technique disclosed herein to provide a touch panel apparatus and a method of controlling a touch panel apparatus and a non-transitory recording medium storing a program for controlling a terminal apparatus to control the automatic light modulation and maintain the brightness of the display. First, a mobile phone terminal and a method of controlling the mobile phone terminal according to one embodiment are described below with reference to the drawings.

Figure 1:
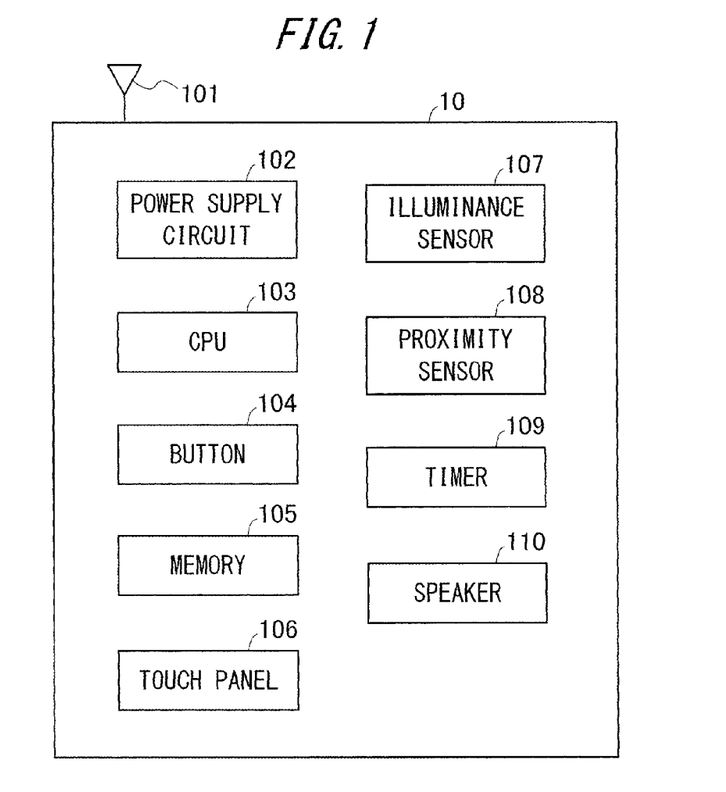
FIG. 1 is a diagram schematically illustrating a hardware configuration of a mobile phone terminal according to an embodiment.

As illustrated in FIG. 1, the mobile phone terminal 10 according to the present embodiment includes an antenna 101, a power supply circuit 102, a CPU (Central Processing Unit) 103, a button 104, a memory 105, a touch panel 106, an illuminance sensor 107, a proximity sensor 108, a timer 109 and a speaker 110. It is noted that the mobile phone terminal 10 corresponds to an example of a terminal apparatus.

The mobile phone terminal 10 performs wireless communications with external wireless transceivers (not illustrated) such as base stations via the antenna 101. The power supply circuit 102 is a circuit for supplying the electric power of a buttery (not illustrated) in the mobile phone terminal 10 for each unit in the mobile phone terminal 10. The CPU 103 is a processor for performing the modulation and demodulation in the wireless communications, processes related to user's operations, a variety of processes related to applications executed in the mobile phone terminal 10. It is noted that a variety of processes performed in the present embodiment can be executed by more than one processor. The button 104 accepts user's operations of the mobile phone terminal 10. The memory 105 is used as a temporary storage area when a variety of processes are performed by the CPU 103. That is, the memory 105 is used as a work area in which a variety of applications and the specific information of the mobile phone terminal such as the terminal number are stored. In addition, the memory 105 stores the settings input by users, the application information, the content data which is provided for the users and the like.

The touch panel 106 displays the results of a variety of processes performed by the CPU 103, the processing states, a variety of contents and the like. In addition, a user touches an item such as an icon displayed on the touch panel 106 with a finger etc. to select the displayed item.

The illuminance sensor 107 is a sensor to detect the illuminance around the mobile phone terminal 10. In the present embodiment, the illuminance sensor 107 is provided adjacent to the touch panel 106. Therefore, the illuminance sensor 107 detects the intensity of light around the touch panel 106 as the illuminance. The illuminance sensor 107 detects the illuminance, that is, brightness by converting the light incident on the light receiving element to electric current. The illuminance sensor 107 includes a type of sensor which outputs analog signals corresponding to the electric current and a type of sensor which converts the analog signals to digital signals and outputs the converted signals. A spectral sensitivity property is used for the illuminance sensor 107 in order to achieve wavelength sensitivity similar to the wavelength sensitivity of the human eye.

The proximity sensor 108 is a sensor to detect an approaching object. The proximity sensor 108 detects events including an event in which the object is approaching to the proximity sensor 108 even when the object does not come into contact with the proximity sensor 108. For example, when a user moves the user's ear closer to the mobile phone terminal 10 for talking on the mobile phone terminal 10, the proximity sensor 108 detects the ear and the processes of the touch panel 106 are automatically canceled. As a result, the wrong operations caused by the user's ear, face and the like coming into contact with the touch panel 106 can be prevented.

There are a variety of sensors for the illuminance sensor 108 including sensors using static electricity, magnetic force, ultrasonics, electromagnetic waves and infrared. The sensor using static electricity called "capacitance type sensor" and includes a capacitor in which an insulator is sandwiched between electrodes. And the sensor detects the variations of the amount of electric energy (capacitance) of the capacitor generated by the approach of an object. Additionally, the sensor using magnetic force is called "induction type sensor" and detects the variations of the impedance of a detection coil due to induced current caused by the approach of an object. Further, the sensor called "infrared type sensor" includes a light emitting element for radiating infrared and a light receiving element for receiving the infrared and converting the light to electric signals. The infrared radiated from the light emitting element is reflected on an object and propagates to the light receiving element. The light receiving element senses the reflected infrared and converts the infrared to electricity. And the infrared type sensor determines that the object is within a predetermined distance when the converted electricity is equal to or more than a predetermined value. The illuminance sensor 108 also includes an "ultrasonic type sensor" and an "electromagnetic wave type sensor".

The timer 109 operates according to the detections by the illuminance sensor 107 and the proximity sensor 108. The details of the operations of the timer 109 are described later. The speaker 110 is used when a user makes or receives a call. In addition, the speaker 109 is used for playing music and video, outputting sound for alarm functions, audio notification of incoming calls and the like.

Figure 2:
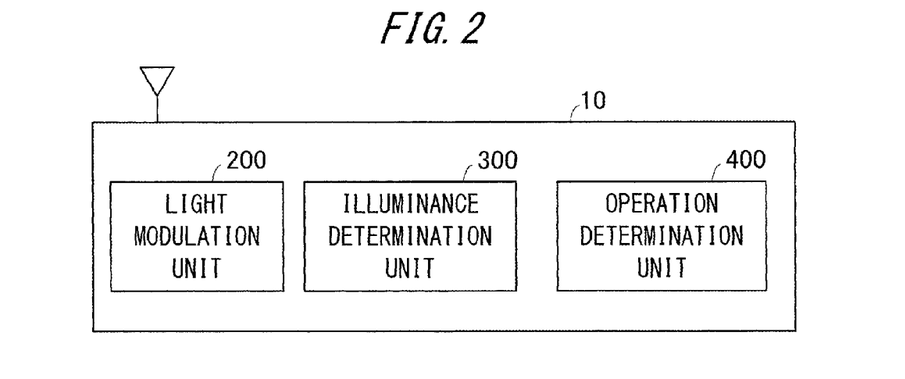
FIG. 2 is a functional diagram illustrating functional units in the mobile phone terminal according to the embodiment.

In the present embodiment, applications stored in the memory 105 of the mobile phone terminal 10 are executed by the CPU 103 and the results of the processes are displayed on the touch panel 106. With these applications executed, the mobile phone terminal 10 functions as a light modulation unit 200, an illuminance determination unit 300 and an operation determination unit 400.

The light modulation unit 200 performs light modulation control processes such as automatic light modulation of the touch panel 106. That is, the light modulation unit 200 adjusts the brightness of the backlight (not illustrated) of the touch panel 106. In the present embodiment, the light modulation unit 200 functions as a determination unit for determining the brightness of the backlight according to the illuminance detected by the illuminance sensor 107 and a setting unit for setting the brightness of the backlight based on the brightness determined by the determination unit. Therefore, the automatic light adjustment of the touch panel 106 can be achieved by the light modulation unit 200.

The illuminance determination unit 300 determines the increase and decrease of the illuminance according to the variation of the illuminance detected by the illuminance sensor 107. Therefore, the illuminance determination unit 300 determines the variation of the illuminance when the mobile phone terminal 10 is moved from a bright area to a dark area or from a dark area to a bright area. In addition, the illuminance determination unit 300 also determines the variation of the illuminance when a user performs touch operations of the touch panel 106 and the user places a finger etc. on the illuminance sensor 107 or the user moves the finger etc. away from the illuminance sensor 107.

The operation determination unit 400 determines whether or not the proximity sensor 108 detects an approaching object. As described above, the proximity sensor 108 provided adjacent to the illuminance sensor 107. Therefore, when the user's finger etc. is placed on the illuminance sensor 107, the proximity sensor 108 can detect the user's finger etc. covering the illuminance sensor 107.

Figure 3A:
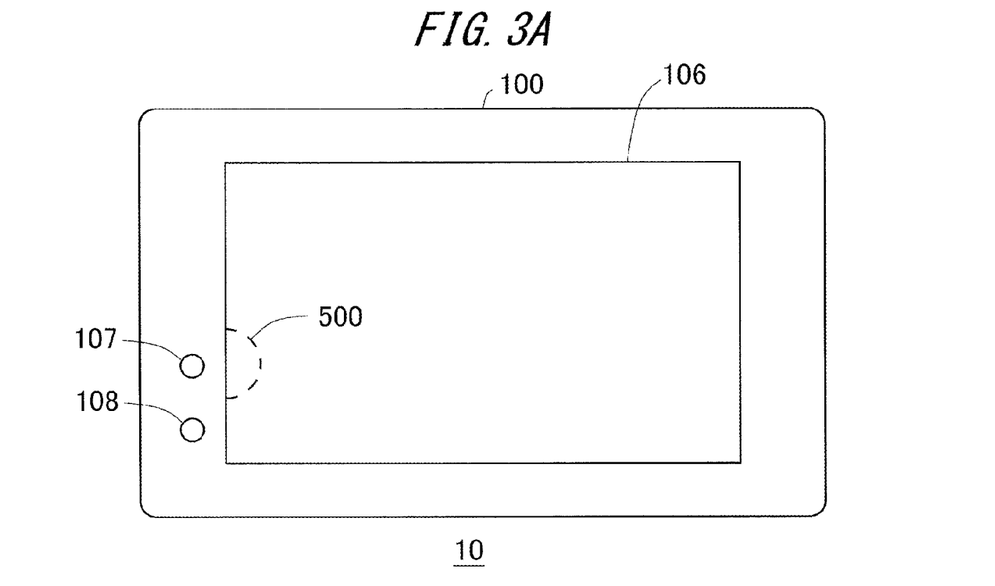
FIG. 3A is a diagram schematically illustrating a structure of a mobile phone terminal according to the embodiment.

Next, an example in which a user uses the touch panel 106 in the present embodiment is described with reference to FIGS. 3A and 3B. As illustrated in FIG. 3A, the mobile phone terminal 10 includes the touch panel 106 positioned roughly in the center of the body 100. In addition, the illuminance sensor 107 and the proximity sensor 108 which are approximate to each other are also provided adjacent to the touch panel 106 on the body 100. Further, an area 500 is set on a part of the screen of the touch panel 106. The area 500 is provided adjacent to the illuminance sensor 107 and occupies a predetermined range. Although the area 500 is illustrated with a dotted line in FIGS. 3A and 3B, the area 500 is not necessarily displayed on the touch panel 106.

Additionally, the area 500 is illustrated as a semicircle, but the shape and the range of the area 500 can be arbitrarily set as long as the area 500 is provided adjacent to the illuminance sensor 107.

Figure 3B:
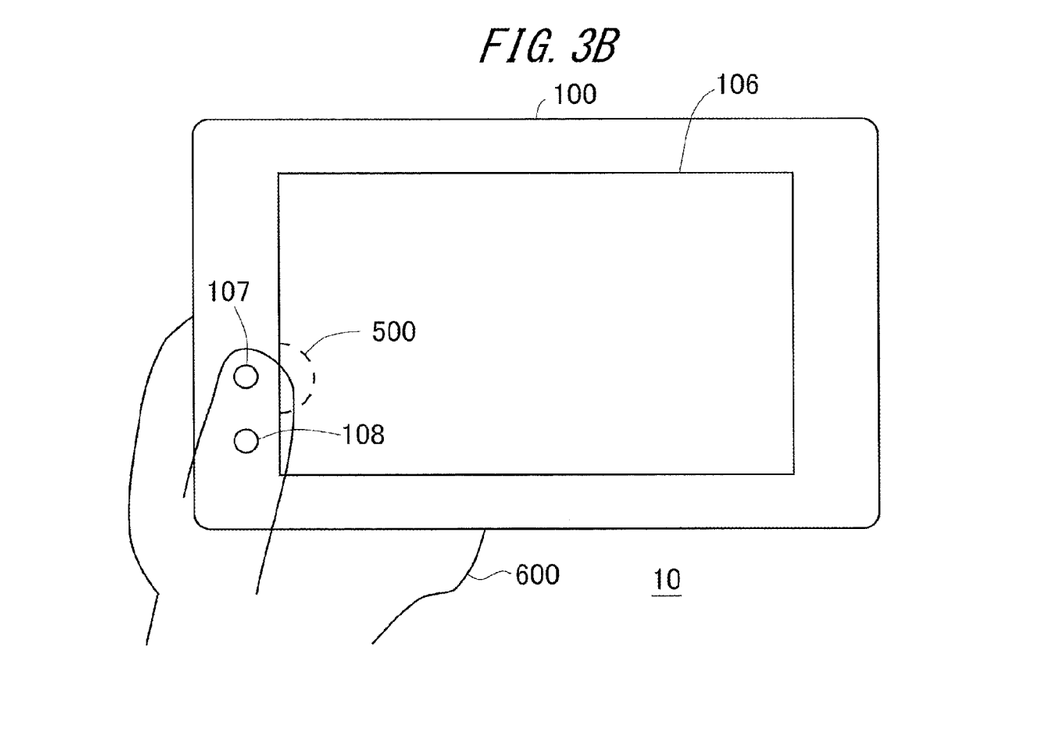
FIG. 3B is a diagram schematically illustrating an example of a usage of the mobile phone terminal according to the embodiment.

Next, FIG. 3B illustrates a case in which the user holds the mobile phone terminal 10 with a hand 600 and places a finger on the illuminance sensor 107 and the proximity sensor 108. As illustrated in FIG. 3B, the user's finger overlaps a part of the touch panel 106 and covers the area 500 partially. When the user holds the mobile phone terminal 10 as illustrated, the finger also is placed on the illuminance sensor 107. Therefore, the illuminance detected by the illuminance sensor 107 sharply decreases in a short time. In this case, when the light modulation unit 200 automatically modulates the amount of light of the touch panel 106, the brightness of the backlight of the touch panel 106 is increased. On the other hand, when the user for example changes the way how to hold the mobile phone terminal 10 so that the user's finger moves away from the illuminance sensor 107, the illuminance detected by the illuminance sensor 107 sharply increases in a short time. In this case, when the light modulation unit 200 automatically modulates the amount of light of the touch panel 106, the brightness of the backlight of the touch panel 106 is decreased.

Thus, when the amount of light is automatically modulated repeatedly each time the user's finger covers the illuminance sensor 107 or moves away from the illuminance sensor 107, the brightness of the backlight of the touch panel 106 is also modulated accordingly. As a result, the user may have trouble seeing the information displayed on the touch panel 106 since the touch panel 106 flickers. With this in mind, the automatic light modulation as described above is controlled to prevent the touch panel 106 from flickering in the present embodiment when the user unintentionally places a finger etc. on the illuminance sensor 107 or moves the finger etc. away from the illuminance sensor 107.

Figure 4:
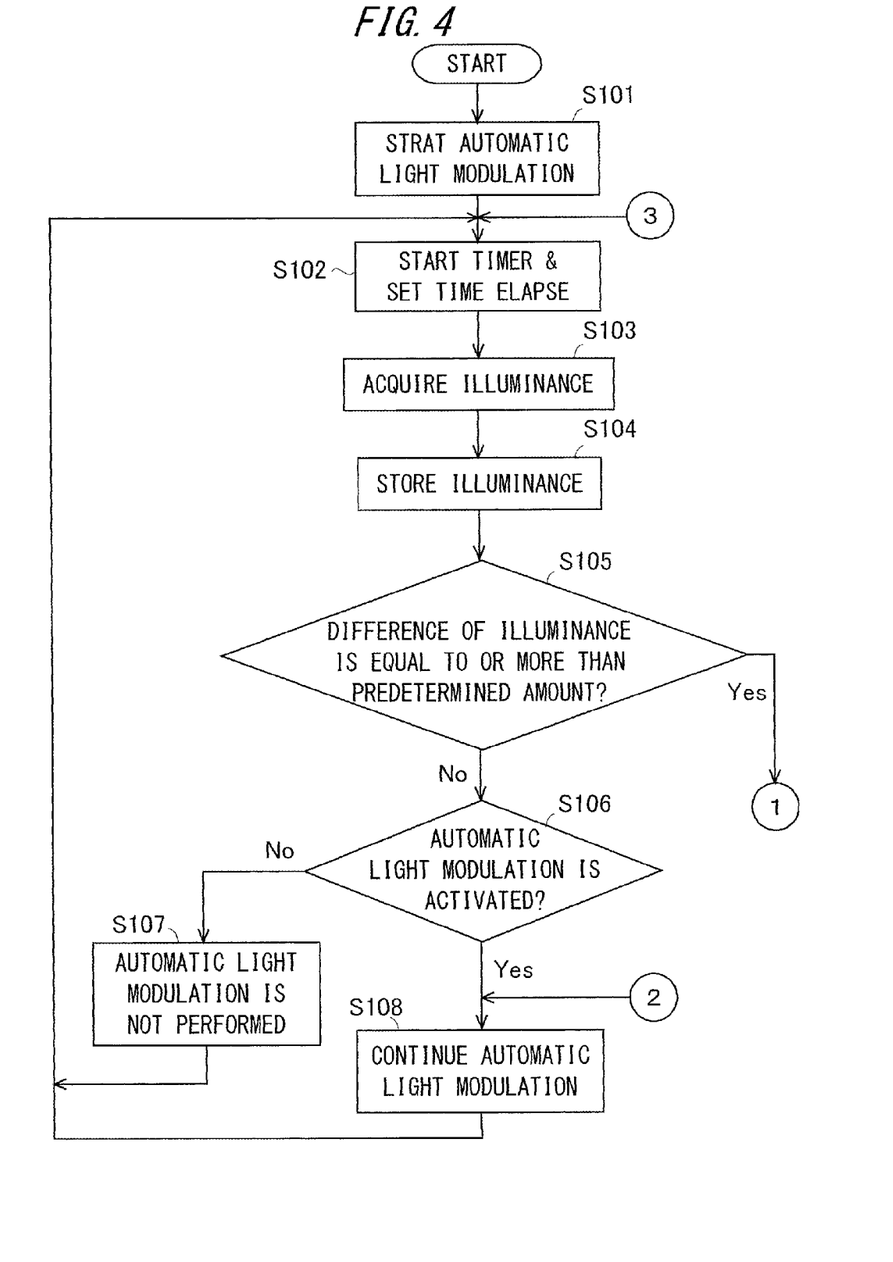
FIG. 4 is a diagram illustrating a part of a flowchart of processes performed in the mobile phone terminal according to the embodiment.

Here, the processes performed when an interrupt event occurs in the mobile phone terminal 10 are described with reference to FIG. 4. In the following descriptions, each step is abbreviated to S. In the present embodiment, the processes in the flowchart as illustrated in FIG. 4 are started when the mobile phone terminal 10 is powered up. Each process in the flowchart as illustrated in FIG. 4 is performed by the CPU 103.

In S101, the light modulation unit 200 starts the automatic light modulation of the touch panel 106. Next, the process proceeds to S102. In S102, the timer 109 is activated and the process is suspended until the time set to the timer 109 elapses. When the time set to the timer 109 elapses, the process proceeds to S103. In S103, the illuminance determination unit 300 acquires the illuminance detected by the illuminance sensor 107. And in S104, the illuminance determination unit 300 stores the value of the acquired illuminance in the memory 105. The memory 105 stores the values of the illuminance acquired by the illuminance determination unit 300 multiple times in the past. Next, in S105, the illuminance determination unit 300 reads the value of the illuminance acquired this time in S103 and the value of the illuminance acquired the last time from the memory 105. And the illuminance determination unit 300 calculates the difference between these values and determines whether or not the difference is equal to or more than a predetermined value. When it is determined that the difference is equal to or more than the predetermined value (S105: Yes), the process proceeds to S109 in FIG. 5. On the other hand, when it is determined that the difference is less than the predetermined value (S105: No), the process proceeds to S106.

In S106, the light modulation unit 200 determines whether or not the automatic light modulation of the touch panel 106 is activated. When it is determined that the automatic light modulation of the touch panel 106 is not activated since the automatic light modulation of the touch panel 106 is suspended for example as described later (S106: No), the light modulation unit 200 proceeds the process to S107. On the other hand, it is determined that the automatic light modulation of the touch panel 106 is activated (S106: Yes), the light modulation unit 200 proceeds the process to S108. In S107, the light modulation unit 200 maintains based on the determination in S106 the state in which the automatic light modulation is suspended and returns the process to S102. On the other hand, in S108, the light modulation unit 200 maintains based on the determination in S106 the state in which the automatic light modulation is activated and returns the process to S102.

Figure 5:
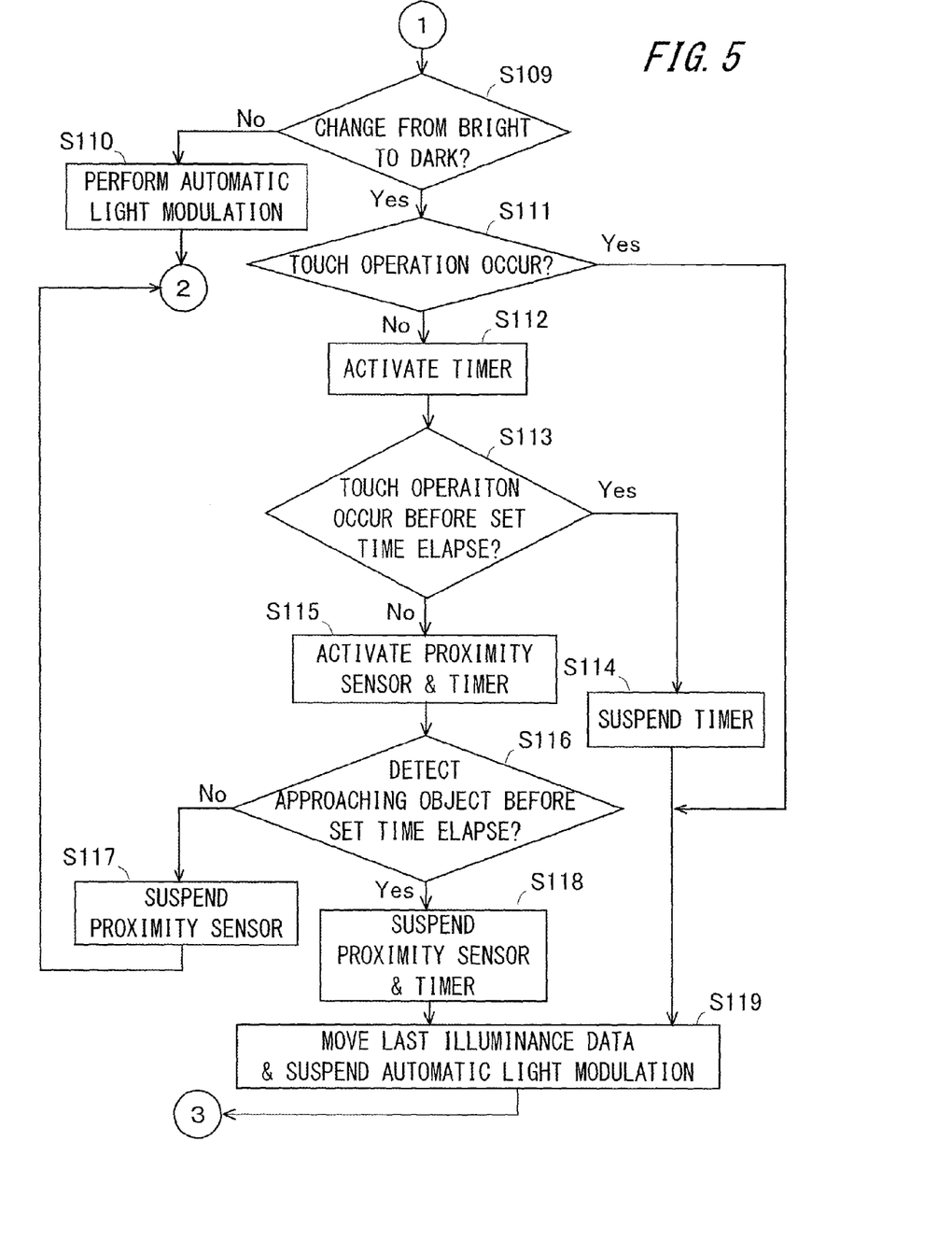
FIG. 5 is a diagram illustrating a part of the flowchart of processes performed in the mobile phone terminal according to the embodiment.

In S109 in FIG. 5, the illuminance determination unit 300 determines whether or not the variation of the illuminance determined in S105 means a predefined decrease of illuminance. Therefore, when the processes from S105 to S109 are performed, it can be determined whether or not a sharp drop of illuminance occurs in a case, such as when the user moves the mobile phone terminal 10 from a bright area to a dark area and when the user places a finger on the illuminance sensor 107. When it is determined that the variation of the illuminance is the increase of the illuminance (S109: No), the process proceeds to S110. On the other hand, when it is determined that the variation of the illuminance is the decrease of the illuminance (S109: Yes), the process proceeds to S111.

In S110, the light modulation unit 200 performs the automatic light modulation of the touch panel 106. Here, the light modulation unit 200 continues the automatic light modulation of the touch panel 106 when the automatic light modulation is active. In addition, the light modulation unit 200 starts the automatic light modulation of the touch panel 106 when the automatic light modulation is suspended. When the process in S110 is completed, the process proceeds to S108 in FIG. 4.

In S111, the operation determination unit 400 determines whether or not a user operation such as touch operation occurs in the area 500 adjacent to the illuminance sensor 107 of the touch panel 106. When the user places a finger etc. on the illuminance sensor 107, the finger etc. may overlap the area 500. With the process in S111 performed, the operation determination unit 400 determines whether or not certain contact such as a touch operation occurs in the area 500. That is, when the process in S111 is performed, it can be detected that the decrease of the illuminance of the illuminance sensor 107 is caused by the finger etc. placed on the illuminance sensor 107. When a user operation does not occur in the area 500 (S111: No), the process proceeds to S112. On the other hand, when a user operation occurs in the area 500 (S111: Yes), the process proceeds to S119.

In S112, the timer 109 is activated. And then the process proceeds to S113. In S113, the operation determination unit 400 determines whether or not a user operation occurs in the area 500 as is the case with the process in S111 before the timer 109 finishes measuring the predetermined time. The time measured by the timer 109 in S113 corresponds to an example of the first elapsed time. Since the process performed by the operation determination unit 400 in S113 similar to the process in S111, the detailed descriptions for the process in S113 are omitted here. In S113, when a user operation does not occur in the area 500 (S113: No), the process proceeds to S115. On the other hand, when a user operation occurs in the area 500 (S113: Yes), the process proceeds to S114.

In S114, the timer 109 activated in S112 is suspended. And then the process proceeds to S119. On the other hand, in S115, the proximity sensor 108 is activated and the time measuring of the timer 109 is started. And then the process proceeds to S116. When the processes in S111 and S113 are performed, it can be detected that the decrease of the illuminance of the illuminance sensor 107 is caused by the finger etc. placed on the illuminance sensor 107. However, even when the finger etc. is placed on the illuminance sensor 107, the finger may not overlap the area 500 in some cases. In such cases, it is determined by the processes in S111 and S113 that the finger etc. is not placed on the illuminance sensor 107. With this in mind, the proximity sensor 108 adjacent to the illuminance sensor 107 is also used in the present embodiment. And the detection result of proximity sensor 108 is used to more reliably detect that the user's finger etc. is placed on the illuminance sensor 107.

In S116, it is determined whether or not the proximity sensor 108 detects an approaching object before the timer 109 finishes measuring the predetermined time. When the proximity sensor 108 does not detect the approaching object (S116: No), the process proceeds to S117. On the other hand, when the proximity sensor 108 detects the approaching object (S116: Yes), the process proceeds to S118. In S117, the proximity sensor 108 is suspended. And then the process proceeds to S108 in FIG. 4. In addition, in S118, the proximity sensor 108 and the time 109 are suspended. And then the process proceeds to S119.

In S119, the data of the values of the illuminance acquired and compared last time in S103, S104 and S105 is moved to another storage area in the memory 105. The processes for moving the data are described later. In addition, in S119, the light modulation unit 200 suspends the automatic light modulation of the touch panel 106. Next, the process returns to S102 in FIG. 4.

When the user's finger etc. is still placed on the illuminance sensor 107 after the process returns from S119 to S102, the illuminance detected by the illuminance sensor 107 maintains the decreased value as described above. Therefore, it is determined in S105 that the difference of the illuminance is less than the predetermined value. Further, since the automatic light modulation of the touch panel 106 is suspended in S119, it is determined in S106 that the automatic light modulation is not activated. As a result, the process proceeds to S107. Thus, the light modulation unit 200 does not perform the automatic light modulation in S107 and control the light modulation to maintain the current brightness of the touch panel 106. In this case, the light modulation unit 200 refers to the last illuminance data which has been moved in S119 and control the light modulation to set the brightness of the touch panel 106 based on the last illuminance value. Therefore, the light modulation unit 200 can maintain the brightness of the touch panel 106 to be the brightness before the illuminance sensor 107 detects the sharp drop of the illuminance. Thus, the variation of the brightness which leads to the flickering of the touch panel 106 can be prevented when the light modulation unit 200 suspends the automatic light modulation of the touch panel 106.

Although the present embodiment is described as above, the configurations and the processes of the terminal apparatus are not limited to those as described above and various variations may be made to the embodiment described herein within the technical scope of the present invention. For example, in the above embodiment, the proximity sensor 108 is suspended in S118. However, the proximity sensor 108 can be activated in S118 to detect that the user's finger etc. moves away from the proximity sensor 108. That is, the light modulation unit 200 can be configured to restart the suspended automatic light modulation of the touch panel 106 when the proximity sensor 108 does not detect an approaching object.

<<Computer Readable Recording Medium>>

It is possible to record a program which causes a computer to implement any of the functions described above on a computer readable recording medium. Here, the functions include the illuminance determination and the light modulation for example. In addition, by causing the computer to read in the program from the recording medium and execute it, the function thereof can be provided. Here, the computer includes a mobile phone terminal for example.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

A terminal apparatus, a method of controlling a terminal apparatus and a non-transitory recording medium storing a program for controlling a terminal apparatus according to one embodiment can advantageously control the automatic light modulation to maintain the brightness of the display.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A terminal apparatus, comprising:
a touch panel;
an illuminance sensor provided adjacent to the touch panel;
a proximity sensor provided adjacent to the illuminance sensor, the proximity sensor detecting a presence of an object approaching the terminal apparatus;
a processor; and
memory storing instructions for causing the processor to execute:
performing an automatic light modulation of the touch panel;
determining whether or not an illuminance detected by the illuminance sensor varies by a predetermined amount; and
determining whether or not an operation of the touch panel occurs in a predetermined area in a vicinity of the illuminance sensor,
wherein after the processor determines that the illuminance detected by the illuminance sensor decreases by the predetermined amount, the processor suspends the automatic light modulation of the touch panel when the processor determines that the operation of the touch panel occurs before a first time elapses and when the processor determines that the operation of the touch panel does not occur before the first time elapses and the proximity sensor detects a presence of an object approaching to the terminal apparatus before a second time elapses after the first time elapses, the processor restarts the suspended automatic light modulation of the touch panel when the proximity sensor does not detect the presence of the object, and the processor suspends the proximity sensor when the proximity sensor does not detect the presence of the object before the second time elapses.

2. The terminal apparatus according to claim 1, wherein the processor continues the suspension of the automatic light modulation of the touch panel when the processor determines that the illuminance detected by the illuminance sensor does not vary by the predetermined amount after the processor suspends the automatic light modulation of the touch panel.

3. The terminal apparatus according to claim 1, wherein the processor starts the automatic light modulation of the touch panel when the processor determines that the illuminance detected by the illuminance sensor increases by the predetermined amount after the processor suspends the automatic light modulation of the touch panel.

4. A method of controlling a terminal apparatus to perform an automatic light modulation of a touch panel of the terminal apparatus, the method comprising:

determining by a processor whether or not an illuminance detected by an illuminance sensor provided adjacent to the touch panel varies by a predetermined amount;

determining by the processor whether or not an operation of the touch panel occurs in a predetermined area in a vicinity of the illuminance sensor;

suspending by the processor the automatic light modulation of the touch panel, wherein after the processor determines that the illuminance detected by the illuminance sensor decreases by the predetermined amount, the processor suspends the automatic light modulation of the touch panel when the processor determines that the operation of the touch panel occurs before a first time elapses and when the processor determines that the operation of the touch panel does not occur before the first time elapses and a proximity sensor provided adjacent to the illuminance sensor detects a presence of an object approaching the terminal apparatus before a second time elapses after the first time elapses, the processor restarts the suspended automatic light modulation of the touch panel when the proximity sensor does not detect the presence of the object, and the processor suspends the proximity sensor when the proximity sensor does not detect the presence of the object before the second time elapses.

5. The method of controlling the terminal apparatus according to claim 4, further comprising:

continuing by the processor the suspension of the automatic light modulation of the touch panel when the processor determines that the illuminance detected by the illuminance sensor does not vary by the predetermined amount after the automatic light modulation of the touch panel is suspended.

6. The method of controlling terminal apparatus according to claim 4, further comprising:

starting by the processor the automatic light modulation of the touch panel when the processor determines that the illuminance detected by the illuminance sensor increases by the predetermined amount after the automatic light modulation of the touch panel is suspended.

7. A non-transitory recording medium storing a program that causes a computer to execute a process comprising:

determining whether or not an illuminance detected by an illuminance sensor provided adjacent to the touch panel varies by a predetermined amount;

determining whether or not an operation of the touch panel occurs in a predetermined area in a vicinity of the illuminance sensor;

suspending the automatic light modulation of the touch panel, wherein after the process determines that the illuminance detected by the illuminance sensor decreases by the predetermined amount, the process suspends the automatic light modulation of the touch panel when the process determines that the operation of the touch panel occurs before a first time elapses and when the process determines that the operation of the touch panel does not occur before the first time elapses and a proximity sensor provided adjacent to the illuminance sensor detects a presence of an object approaching the computer before a second time elapses after the first time elapses, the process restarts the suspended automatic light modulation of the touch panel when the proximity sensor does not detect the presence of the object, and the process suspends the proximity sensor when the proximity sensor does not detect the presence of the object before the second time elapses.

8. The non-transitory recording medium according to claim 7, further comprising:

continuing the suspension of the automatic light modulation of the touch panel when the process determines that the illuminance detected by the illuminance sensor does not vary by the predetermined amount after the automatic light modulation of the touch panel is suspended.

9. The non-transitory recording medium according to claim 7, further comprising: starting the automatic light modulation of the touch panel when the process determines that the illuminance detected by the illuminance sensor increases by the predetermined amount after the automatic light modulation of the touch panel is suspended.

10. The terminal apparatus according to claim 1, wherein the object detected by the proximity sensor does not come into contact with the terminal apparatus.

11. The method of controlling the terminal apparatus according to claim 4, wherein the object detected by the proximity sensor does not come into contact with the terminal apparatus.

12. The non-transitory recording medium according to claim 7, wherein the object detected by the proximity sensor does not come into contact with the terminal apparatus.

* * * * *